(12) United States Patent
Qiu

(10) Patent No.: US 9,548,969 B2
(45) Date of Patent: Jan. 17, 2017

(54) ENCRYPTION/DECRYPTION METHOD, SYSTEM AND DEVICE

(71) Applicant: ZTE Corporation, Shenzhen, Guangdong (CN)

(72) Inventor: Jiong Qiu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/649,311

(22) PCT Filed: Aug. 12, 2013

(86) PCT No.: PCT/CN2013/081300
§ 371 (c)(1),
(2) Date: Jun. 3, 2015

(87) PCT Pub. No.: WO2013/189329
PCT Pub. Date: Dec. 27, 2013

(65) Prior Publication Data
US 2015/0319140 A1  Nov. 5, 2015

(30) Foreign Application Priority Data

Dec. 4, 2012  (CN) .......................... 2012 1 0512231

(51) Int. Cl.
*H04L 29/06* (2006.01)
*H04W 12/02* (2009.01)
(Continued)

(52) U.S. Cl.
CPC ............ *H04L 63/04* (2013.01); *G06F 21/602* (2013.01); *H04W 12/02* (2013.01); *H04W 12/04* (2013.01); *H04W 4/001* (2013.01)

(58) Field of Classification Search
CPC .......................... H04L 63/0236; H04L 63/0428
(Continued)

(56) References Cited

U.S. PATENT DOCUMENTS

2008/0070561 A1  3/2008  Keum
2010/0299739 A1  11/2010  Chai
(Continued)

FOREIGN PATENT DOCUMENTS

CN  1894897 A  1/2007
CN  101188839 A  5/2008
(Continued)

OTHER PUBLICATIONS

Supplementary European Search Report in European application No. 13806901.8, mailed on Dec. 8, 2015.
(Continued)

*Primary Examiner* — Anthony Brown
(74) *Attorney, Agent, or Firm* — Oppedahl Patent Law Firm LLC

(57) ABSTRACT

An encryption/decryption method are described, which includes that a terminal performs an encryption operation according to information of an encryption sub-node of an Encrypt And Decrypt Management Object (EADMO) node of a local Device Management (DM) tree and reports to a DM server encrypted data state information generated after the encryption succeeds; and the terminal performs a decryption operation according to the encrypted data state information sent from the DM server. An encryption/decryption system and device are also described. By means of technical solutions of embodiments of the disclosure, operations are simple without causing data loss, and a problem that data of a non-local terminal cannot be encrypted is solved.

21 Claims, 3 Drawing Sheets

(51) Int. Cl.
  *G06F 21/60* (2013.01)
  *H04W 12/04* (2009.01)
  *H04W 4/00* (2009.01)

(58) Field of Classification Search
  USPC .......................................................... 713/162
  See application file for complete search history.

(56) References Cited

U.S. PATENT DOCUMENTS

| | | | |
|---|---|---|---|
| 2011/0295947 A1* | 12/2011 | Yu | ...................... H04L 41/0803 709/203 |
| 2012/0066367 A1 | 3/2012 | Chai | |
| 2012/0110345 A1 | 5/2012 | Pigeon | |
| 2012/0115455 A1* | 5/2012 | Rao | ...................... H04W 12/06 455/418 |
| 2012/0300932 A1 | 11/2012 | Cambridge | |
| 2013/0111030 A1* | 5/2013 | Yu | ...................... G06F 21/6218 709/225 |
| 2014/0365630 A1 | 12/2014 | Chai | |

FOREIGN PATENT DOCUMENTS

| | | |
|---|---|---|
| CN | 101415182 A | 4/2009 |
| CN | 101646168 A | 2/2010 |
| CN | 101711028 A | 5/2010 |
| CN | 102781001 A | 11/2012 |
| EP | 2249512 A1 | 11/2010 |
| EP | 2249512 B1 | 3/2012 |
| EP | 2432154 A1 | 3/2012 |
| EP | 2448303 A1 | 5/2012 |

OTHER PUBLICATIONS

Large scale integrating project Expending LTE for Devices WP4-End-to-End(E2E) M2M System,mailed on Oct. 2012.
International Search Report in international application No. PCT/CN2013/081300, mailed on Nov. 21, 2013.
English Translation of the Written Opinion of the International Search Authority in international application No. PCT/CN2013/081300, mailed on Nov. 21, 2013.
The remote control of the mobile terminal management platform in the research and design,mailed on Nov. 15, 2008.

* cited by examiner

ENCRYPTION/DECRYPTION METHOD, SYSTEM AND DEVICE

TECHNICAL FIELD

The disclosure relates to an encryption technology for mobile communications, particularly to an encryption/decryption method, system and device.

BACKGROUND

Nowadays, mobile terminals are being used more and more widely, which increases the risk of theft or loss of data stored in mobile terminals. At present, a technical solution for protecting data in a mobile terminal through encryption in the industry has the following problems:

a user fails to encrypt data stored in a mobile terminal that is not carried along;

a process of an encryption operation, which may need to be implemented by connecting a personal computer through a data wire, is too complicated;

decryption operations are complicated if there are too many encrypted files and the encrypted files further need to be hidden or renamed and the like, and besides, data can be hardly recovered if the user forgets a corresponding encryption operation, thus causing loss.

SUMMARY

In view of this, a major purpose of embodiments of the disclosure is to provide an encryption/decryption method, system and device to at least solve the problem above.

To achieve the purpose, technical solutions of the embodiments of the disclosure is implemented by the following way.

An embodiment of the disclosure provides an encryption method, wherein the method includes that:

performing, by a terminal, an encryption operation according to information of an encryption sub-node of an Encrypt And Decrypt Management Object (EADMO) node of a local Device Management (DM) tree when receiving an encryption instruction sent from a DM server;

reporting to the DM server, by the terminal, encrypted data state information generated after the encryption succeeds; updating, by the terminal according to an updating instruction sent from the DM server, information of a Store Uniform Resource Locator (URL) sub-node of the EADMO node of the DM tree into a URL for the DM server to locally store the encrypted data state information.

Preferably, the method may further include: before the DM server sends the encryption instruction to the terminal, obtaining, by the DM server, information of a State sub-node of the EADMO node of the DM tree of the terminal, determining whether the information of the State sub-node is unencrypted; if yes, then sending the encryption instruction to the terminal; otherwise, sending the terminal or a terminal currently used by a user a message indicating that encryption has been performed.

Preferably, the method may further include: after the terminal performs the encryption successfully, requesting the DM server, by the terminal, for encrypted data state information to which a URL stored by the Store URL sub-node of the EADMO node of the DM tree of the terminal is directed, when receiving a decryption instruction sent from the DM server;

performing, by the terminal, a decryption operation according to the encrypted data state information when receiving the encrypted data state information sent from the DM server.

Preferably, the method may further include: after the terminal performs the encryption successfully, sending, by the terminal, an encryption success message to the DM server, and updating the information of the State sub-node of the EADMO node of the local DM tree to be encrypted according to an updating instruction sent from the DM server.

An embodiment of the disclosure further provides a decryption method, wherein the method includes that:

requesting a Device Management (DM) server, by a terminal, for encrypted data state information to which a Uniform Resource Locator (URL) stored by a Store URL sub-node of an Encrypt And Decrypt Management Object (EADMO) node of a DM tree of the terminal is directed, when receiving a decryption instruction sent from the DM server;

performing, by the terminal, a decryption operation according to the encrypted data state information sent from the DM server.

Preferably, the method may further include: before the DM server sends the decryption instruction to the terminal, obtaining, by the DM server, information of a State sub-node of the EADMO node of the DM tree of the terminal; determining whether the information of the State sub-node has been encrypted; if yes, sending the decryption instruction to the terminal; otherwise, sending the terminal or a terminal currently used by a user a message indicating that decryption has been performed.

Preferably, the method may further include: before the DM server sends the decryption instruction to the terminal, obtaining, by the DM server, a decryption key held by a user from the terminal or a terminal currently used by a user; verifying whether the decryption key can be matched with a locally stored decryption key; if yes, sending the decryption instruction to the terminal; otherwise, sending a key verification failure message to the corresponding terminal or the terminal currently used by the user.

Preferably, the method may further include: after the terminal performs the decryption successfully, sending, by the terminal, a decryption success message to the DM server; and updating, by the terminal according to an updating instruction sent from the DM server, the information of the State sub-node of the EADMO node of the local DM tree to be unencrypted.

An embodiment of the disclosure further provides a terminal, wherein the terminal includes: a first receiving unit, a first encrypting unit, a first sending unit, and a first storing unit, wherein the first receiving unit is configured to receive an encryption instruction sent from a Device Management (DM) server; to receive an updating instruction sent from the DM server, wherein the instruction updates information of a Store Uniform Resource Locator (URL) sub-node of an Encrypt And Decrypt Management Object (EADMO) node of a Device Management (DM) tree of the first storing unit into a URL, wherein the URL is a URL for the DM server to locally store encrypted data state information sent from the first sending unit;

the first encrypting unit is configured, when the first receiving unit receives the encryption instruction, to perform an encryption operation according to information of an encryption sub-node of the EADMO node of the DM tree, wherein the information of the encryption sub-node of the EADMO node of the DM tree is stored by the first storing unit; and to generate the encrypted data state information after the encryption succeeds;

the first sending unit is configured to send the DM server the encrypted data state information generated after the first encrypting unit performs the encryption successfully;

the first storing unit is configured to store information of the EADMO node of the DM tree, to update, according to the updating instruction received by the first receiving unit, the information of the Store URL sub-node of the EADMO node of the DM tree into the URL for the DM server to locally store the encrypted data state information.

Preferably, the first receiving unit may be further configured to receive from the DM server an instruction for obtaining information of a State sub-node, wherein the information of the state sub-node is stored by the first storing unit, to receive the encryption instruction or a message indicating that encryption has been performed, wherein the encryption instruction or the message indicating that encryption has been performed is sent from the DM server;

the first sending unit may be further configured to send the information of the State sub-node to the DM server when the first receiving unit receives from the DM server the instruction for obtaining the information of the State sub-node.

Preferably, the terminal may further include: a second receiving unit, a first decrypting unit, a second sending unit and a second storing unit, wherein the second receiving unit is configured to receive a decryption instruction sent from the DM server and to receive the encrypted data state information sent from the DM server;

the first decrypting unit is configured to perform a decryption operation according to the encrypted data state information received by the second receiving unit;

the second sending unit is configured, when the second receiving unit receives the decryption instruction, to send the DM server an instruction for obtaining the encrypted data state information, wherein the encrypted data state information is encrypted data state information to which a URL in information of a Store URL sub-node is directed and the Store URL sub-node is located in an EADMO node of a DM tree of the second storing unit;

the second storing unit is configured to store information of the EADMO node of the DM tree.

Preferably, the first sending unit may be further configured to send an encryption success message to the DM server after the first encrypting unit performs the encryption successfully;

the first receiving unit may be further configured to receive the updating instruction from the DM server;

the first storing unit may be further configured to update, according to the updating instruction received by the first receiving unit, the information of the State sub-node of the EADMO node of the DM tree to be encrypted.

An embodiment of the disclosure further provides a terminal, wherein the terminal includes: a second receiving unit, a first decrypting unit, a second sending unit and a second storing unit, wherein the second receiving unit is configured to receive a decryption instruction sent from a Device Management (DM) server, and to receive encrypted data state information sent from the DM server;

the first decrypting unit is configured, when the second receiving unit receives the encrypted data state information sent from the DM server, to perform a decryption operation according to the encrypted data state information;

the second sending unit is configured, when the second receiving unit receives the decryption instruction, to send the DM server an instruction for obtaining the encrypted data state information, wherein the encrypted data state information is encrypted data state information to which a Uniform Resource Locator (URL) in information of a Store URL sub-node is directed, and the Store URL sub-node is located in an Encrypt And Decrypt Management Object (EADMO) node of a DM tree of the second storing unit;

the second storing unit is configured to store information of the EADMO node of the DM tree.

Preferably, the second receiving unit may be further configured to receive from the DM server an instruction for obtaining information of a State sub-node of the EADMO node of the DM tree of the second storing unit;

the second sending unit may be further configured, when the second receiving unit receives from the DM server the instruction for obtaining the information of the State sub-node, to send the information of the State sub-node to the DM server.

Preferably, the second receiving unit may be further configured to receive an instruction for obtaining a decryption key held by a user, wherein the instruction is sent from the DM server;

the second sending unit may be further configured, when the second receiving unit receives the instruction for obtaining the decryption key held by the user, to send the decryption key held by the user to the DM server.

Preferably, the second sending unit may be further configured, when the first decryption unit performs the decryption successfully, to send a decryption success message to the DM server;

the second receiving unit may be further configured to receive an updating instruction from the DM server;

the second storing unit may be further configured to update, according to the updating instruction received by the first receiving unit, the stored information of the State sub-node of the EADMO node of the DM tree to be unencrypted.

An embodiment of the disclosure further provides a DM server, wherein the DM server includes: a third sending unit, a third receiving unit and a third storing unit, wherein the third sending unit is configured to send an encryption instruction to a terminal; when the third receiving unit receives encrypted data state information generated and sent after the terminal performs encryption successfully, to indicate the terminal to update information of a Store Uniform Resource Locator (URL) sub-node of an Encrypt And Decrypt Management Object (EADMO) node of a local DM tree of the terminal, wherein the updated information of the Store URL sub-node is a URL for the third storing unit to store the encrypted data state information;

the third receiving unit is configured to generate and send the encrypted data state information after the terminal performs the encryption successfully;

the third storing unit is configured to store the encrypted data state information received by the third receiving unit.

Preferably, the DM server may further include:

a first determining unit configured, when the third receiving unit receives information of a State sub-node of the EADMO node of the DM tree of the terminal, to determine whether the information of the State sub-node is unencrypted;

the third sending unit is further configured to send the terminal an instruction for obtaining the information of the State sub-node; when a determination result of the first determining unit is yes, to send an encryption instruction to the terminal; and when a determination result of the first determining unit is no, to send the terminal or a terminal used by a user a message indicating that encryption has been performed;

the third receiving unit is further configured to receive the information of the State sub-node from the terminal.

Preferably, the third receiving unit may be further configured to receive a decryption key generated and sent after the terminal performs the encryption successfully;

the third storing unit may be further configured to store the decryption key generated and sent after the terminal performs the encryption successfully.

Preferably, the third receiving unit may be further configured to receive an encryption success message sent after the terminal performs the encryption successfully;

the third sending unit may be further configured, when the third receiving unit receives the encryption success message sent after the terminal performs the encryption successfully, to send an updating instruction to the terminal to indicate the terminal to update the information of the State sub-node of the EADMO node of the local DM tree to be encrypted.

Preferably, the DM server may further include: a fourth sending unit, a fourth receiving unit and a fourth storing unit, wherein the fourth sending unit is configured to send a decryption instruction to the terminal; when the fourth receiving unit receives from the terminal an instruction for requesting for the encrypted data state information, to send the encrypted data state information to the terminal;

the fourth receiving unit is configured to receive from the terminal an instruction for requesting for the encrypted data state information to which the URL stored by the Store URL sub-node is directed;

the fourth storing unit is configured to store the encrypted data state information.

An embodiment of the disclosure further provides a DM server, wherein the DM server includes: a fourth sending unit, a fourth receiving unit, and a fourth storing unit, wherein the fourth sending unit is configured to send a decryption instruction to a terminal; and when the fourth receiving unit receives from the terminal an instruction for requesting for encrypted data state information to which a Uniform Resource Locator (URL) is directed and which is stored by the fourth storing unit, to send the terminal the encrypted data state information to which the URL is directed;

the fourth receiving unit is configured to receive from the terminal the instruction for requesting for the encrypted data state information to which the URL is directed, wherein the URL is located in a Store URL of an Encrypt And Decrypt Management Object (EADMO) node of a DM tree of the terminal;

the fourth storing unit is configured store the encrypted data state information.

Preferably, the DM server may further include:

a second determining unit configured, when the fourth receiving unit receives information of a State sub-node, to determine whether the information of the State sub-node is encrypted;

the fourth sending unit is further configured to send the terminal an instruction for obtaining the information of the State sub-node; when a determining result of the second determining unit is yes, to send a decryption instruction to the terminal, and when a determining result of the second determining unit is no, to send the terminal or a terminal currently used by a user a message indicating that decryption has been performed;

the fourth receiving unit is configured to receive from the terminal the information of the State sub-node of the EADMO of the DM tree.

Preferably, the DM server may further include:

a first verifying unit, configured to verify whether a decryption key held by a user and received by the fourth receiving unit can be matched with a decryption key stored by the fourth storing unit;

the fourth sending unit is further configured to send the terminal or a terminal currently used by a user an instruction for obtaining the decryption key held by the user; when a verifying result of the first verifying unit is yes, to send a decryption instruction to the terminal; and when a verifying result of the first verifying unit is no, to send the corresponding terminal or the terminal currently used by the user a key verification failure message;

the fourth receiving unit is further configured to receive the decryption key sent from the terminal or the terminal currently used by the user;

the fourth storing unit is further configured to store the decryption key.

Preferably, the fourth receiving unit may be further configured to receive a decryption success message sent after the terminal performs the decryption successfully;

the fourth sending unit may be further configured, when the fourth receiving unit receives the decryption success message sent after the terminal performs the decryption successfully, to indicate the terminal to update the information of the State sub-node of the EADMO of the DM tree to be unencrypted.

An embodiment of the disclosure further provides an encryption system, wherein the encryption system includes: a terminal and a DM server, wherein the DM server is configured to send an encryption instruction to the terminal; when receiving encrypted data state information sent from the terminal, to update information of a Store Uniform Resource Locator (URL) sub-node of an Encrypt And Decrypt Management Object (EADMO) node of a DM tree of the terminal, wherein the updated information of the Store URL sub-node is a URL for the DM server to locally store the encrypted data state information;

the terminal is configured, when receiving the encryption instruction sent from the DM server, to perform an encryption operation according to information of an encryption sub-node of the EADMO node of the local DM tree, and to report to the DM server the encrypted data state information generated after the encryption succeeds, and to update, according to an updating instruction sent from the DM server, the information of the Store URL sub-node of the EADMO node of the DM tree into the URL for the DM server to locally store the encrypted data state information.

An embodiment of the disclosure further provides a decryption system, wherein the decryption system includes: a terminal and a DM server, wherein the DM server is configured to send a decryption instruction to the terminal, and to send the terminal encrypted data state information to which a Uniform Resource Locator (URL) requested by the terminal is directed;

the terminal is configured, when receiving the decryption instruction sent from the DM server, to request the DM server for the encrypted data state information to which a URL stored by a Store URL sub-node of an Encrypt And Decrypt Management Object (EADMO) node of a DM tree of the terminal is directed, and to perform a decryption operation according to the encrypted data state information sent from the DM server.

In the technical solutions provided by the embodiments of the disclosure, after stored data is encrypted, encrypted data state information is reported to a DM server; during a decryption operation performed subsequently, the decryption operation is performed according to the corresponding encrypted data state information sent from the DM server, and a user does not need to record files that have been decrypted and details including hiding and renaming and the like of the decryption operation, thus operation is simple without causing data loss. In the meanwhile, the user may request the DM server to encrypt data of a non-local terminal through a used terminal, and the DM server sends a decryption instruction to the non-local terminal, thus solving a problem that a user cannot encrypt a non-local terminal.

DETAILED DESCRIPTION

The embodiments of the disclosure will be further expounded below in conjunction with the drawings and specific embodiments.

Notably, technical solutions of embodiments of the disclosure may be applied to a mobile terminal, and may be also applied to a traditional terminal device including a personal computer and so on.

Figure 1:
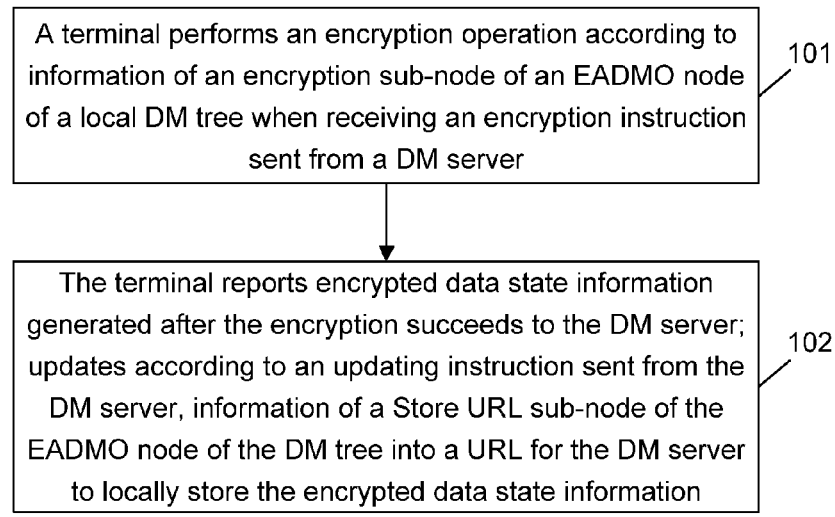
FIG. 1 is a schematic diagram of an implementation process of an encryption method according to an embodiment of the disclosure.

FIG. 1 is a schematic diagram of an implementation process of an encryption method according to an embodiment of the disclosure. As shown in FIG. 1, the implementation process includes the following steps.

Step 101: A terminal performs an encryption operation according to information of an encryption sub-node of an Encrypt And Decrypt Management Object (EADMO) node of a local Device Management (DM) tree when receiving an encryption instruction sent from a DM server.

Before step 101, the implementation process further includes that:

a user sends an encryption request message to the DM server through a terminal used currently, and the DM server sends the encryption instruction to the terminal when receiving the encryption request message; or the user sends the encryption request message to the DM server through the terminal directly, and the DM server sends the encryption instruction to the terminal when receiving the encryption request message.

Here, before the DM server sends the encryption instruction to the terminal, the following processing flow is further included.

The DM server establishes a DM session connection with the terminal, including that the DM server sends a DM notification message to the terminal by means of Wireless Application Protocol (WAP) Push when receiving the encryption request message; and the terminal exchanges device information with the DM server when receiving the DM notification message, and performs authentication with the DM server mutually.

Here, the DM session connection may be established according to a regulation of an Object Management Architecture (OMA) protocol.

Here, after the DM server receives the encryption request message and establishes the DM session connection with the terminal, the implementation process further includes that the DM server obtains information of a State sub-node of the EADMO node of the DM tree of the terminal, determines whether the information of the State sub-node is unencrypted; if yes, it sends the encryption instruction to the terminal; otherwise, it sends a message indicating that encryption has been performed to the terminal or a terminal currently used by a user; wherein if the encryption request message received by the DM server is an encryption request message sent by the user to the DM server through the terminal directly, the DM server sends the terminal the message indicating that encryption has been performed to notify the user that data has been encrypted; if the encryption request message received by the DM server is an encryption request message sent by the user to the DM server through the terminal used currently, the DM server sends the message indicating that encryption has been performed to the terminal currently used by the user to notify the user that data has been encrypted.

Here, the EADMO node is a node added to a DM tree structure of the terminal.

Here, the encryption sub-node of the EADMO node of the DM tree of the terminal includes:

an encryption mode sub-node, an encryption key words sub-node and an encryption level sub-node, wherein information stored by the encryption mode sub-node is a set encryption mode, including encryption by a file name and/or encryption by a file suffix name;

information stored by the encryption key words sub-node is a set encrypted keyword, including a file name keyword and a keyword of a file suffix name, and the file name is a file name without a file suffix name;

information stored by the encryption level sub-node is a set encryption level; different encryption levels may be set according to different complexities of encryption algorithms, and an encryption level is positively correlated to the complexity of an encryption algorithm;

the encryption mode, the encryption keyword and the encryption level may be preset directly at the terminal by the user, or when the user connects the terminal used currently to the DM server, the DM server may also establishes the DM session connection with the terminal by using a parameter configuration function which has already been implemented by the OMA protocol, and synchronizes the encryption mode, the encryption keyword and the encryption level set by the user to a corresponding sub-node of the EADMO node of the DM tree of the terminal.

Here, when the terminal receives the encryption instruction sent from the DM server, the instruction is an instruction for executing a preset instruction string in the encryption sub-node of the EADMO node of the DM tree, and an encryption operation will be performed for data of the terminal according to the encryption mode, the encryption keyword and the encryption level stored in the encryption sub-node of the EADMO node of the DM tree.

Here, the encrypted data state information includes the following information of encrypted data: an encryption mode, an encryption keyword and an encryption level.

Step 102: The terminal reports encrypted data state information generated after the encryption succeeds to the DM server; updates according to an updating instruction sent from the DM server, information of a Store URL sub-node of the EADMO node of the DM tree into a URL for the DM server to locally store the encrypted data state information.

Preferably, the terminal may also report a decryption key generated after the encryption succeeds to the DM server after the encryption succeeds.

Preferably, when the DM server receives the decryption key, this step further includes that: the DM server sends the decryption key to the terminal or the terminal currently used by the user when receiving the decryption key; wherein if the encryption request message received by the DM server is an encryption request message sent by the user to the DM server by using the terminal directly, then the DM server sends the received decryption key to the terminal to notify the decryption key to the user; if the encryption request message received by the DM server is an encryption request message sent by the user to the DM server by using the terminal used currently, the DM server sends the received decryption key to the terminal currently used by the user to notify the decryption key to the user.

Preferably, the terminal sends an encryption success message to the DM server when the encryption succeeds and sends an encryption failure message to the DM server when the encryption fails.

Preferably, the DM server further sends an encryption operation result to the terminal or the terminal currently used by the user when receiving the encryption operation result sent from the terminal; wherein the DM server sends the received encryption operation result to the terminal to notify the encryption operation result to the user if the encryption request message received by the DM server is an encryption request message sent by the user to the DM server by using the terminal directly, and the DM server sends the received encryption operation result to the terminal currently used by the user to notify the encryption operation result to the user if the encryption request message received by the DM server is an encryption request message sent by the user to the DM server by using the terminal used currently.

Preferably, when the DM server receives the encryption success message sent from the terminal, the implementation process further includes that:

the DM server sends the updating instruction to the terminal to update the information of the State sub-node of the EADMO node of the DM tree of the terminal to be encrypted.

Figure 2:
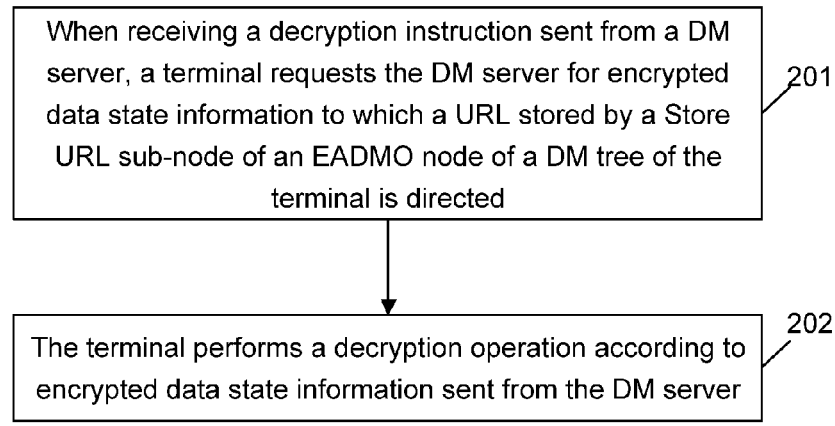
FIG. 2 is a schematic diagram of an implementation process of a decryption method according to an embodiment of the disclosure.

FIG. 2 is a schematic diagram of an implementation process of a decryption method according to an embodiment of the disclosure. As shown in FIG. 2, the implementation process includes the following steps.

Step 201: When receiving a decryption instruction sent from a DM server, a terminal requests the DM server for encrypted data state information to which a URL stored by a Store URL sub-node of an EADMO node of a DM tree of the terminal is directed.

Before step 201, the implementation process further includes that:

a user sends a decryption request message to the DM server through a terminal currently used, and the DM server sends the decryption instruction to the terminal when receiving the decryption request message, or the user sends the decryption request message to the DM server through a terminal directly, and the DM server sends the decryption instruction to the terminal when receiving the decryption request message.

Preferably, the DM server further establishes a DM session with the terminal before sending the decryption instruction to the terminal, which is the same as the processing before the DM server sends the encryption instruction to the terminal in step 101.

Preferably, after the DM server receives the decryption message and establishes the DM session connection with the terminal, the implementation process further includes that:

the DM server obtains information of a State sub-node of the EADMO node of the DM tree of the terminal and determines whether the information of the State sub-node is encrypted: if yes, it sends the decryption instruction to the terminal: otherwise, it sends the terminal or the terminal currently used by the user a message indicating that decryption has been performed.

Wherein if the decryption request message received by the DM server is a decryption request message sent by the user to the DM server by using the terminal directly, then the DM server sends the terminal the message indicating that decryption has been performed to notify user that data has been decrypted; if the decryption request message received by the DM server is a decryption request message sent by the user to the DM server by using the terminal used currently, then the DM server sends the terminal currently used by the user the received message indicating that decryption has been performed to notify the user that data has been decrypted.

Preferably, after the DM server receives the decryption request message and establishes the DM session connection with the terminal, the implementation process further includes that:

the DM server obtains a decryption key held by a user from the terminal or a terminal currently used by the user; verifies whether the decryption key held by the user can be matched with a locally stored decryption key; if yes, it sends the decryption instruction to the terminal; otherwise, it sends a key verification failure message to the corresponding terminal or the terminal currently used by the user.

wherein if the decryption request message received by the DM server is a decryption request message sent by the user to the DM server by using the terminal directly, then the DM server sends the terminal the key verification failure message to notify a key verification failure to the user; if the decryption request message received by the DM server is a decryption request message sent by the user to the DM server by using the terminal used currently, then the DM server sends the terminal the key verification failure message to notify a key verification failure to the user.

Step 202: The terminal performs a decryption operation according to encrypted data state information sent from the DM server.

In step 201, when the terminal receives the decryption instruction sent from the DM server, the instruction is an instruction for executing a preset instruction string in a decryption sub-node of the EADMO node of the DM tree. Encrypted data state information to which a URL stored by a Store URL sub-node of the EADMO node of the DM tree of the terminal will be requested from the DM server, and when the encrypted data state information sent from the DM server is received, the decryption operation is performed according to the encrypted data state information.

Preferably, the terminal sends a decryption success message to the DM server after the decryption succeeds, and sends a decryption failure message to the DM server after the decryption fails.

Preferably, when receiving a decryption operation result sent from the terminal, the DM server further sends the decryption operation result to the terminal or the terminal currently used by the user; wherein the DM server sends the received decryption operation result to the terminal to notify the decryption operation result to the user if the decryption request message received by the DM server is a decryption request message sent by the user to the DM server by using the terminal directly, and the DM server sends the received decryption operation result to the terminal currently used by the user to notify the decryption operation result to the user if the decryption request message received by the DM server is a decryption request message sent by the user to the DM server by using the terminal used currently.

Preferably, the DM server further sends an updating instruction to the terminal when receiving the decryption success message sent from the terminal, so as to update the information of the State sub-node of the EADMO node of the DM tree of the terminal to be unencrypted.

Figure 3:
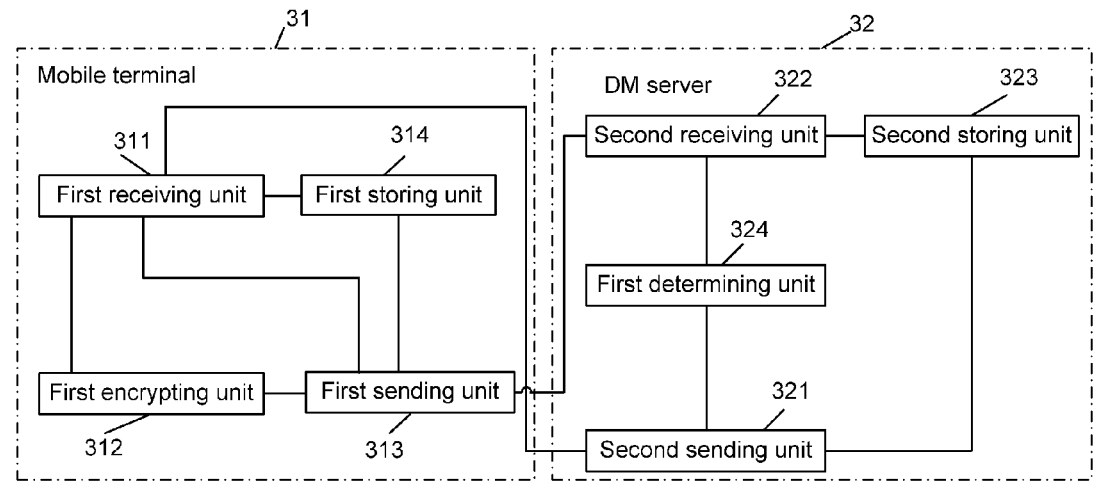
FIG. 3 is a schematic diagram of a composition structure of an encryption system according to an embodiment of the disclosure.

FIG. 3 is a schematic diagram of a composition structure of an encryption system according to an embodiment of the disclosure. As shown in FIG. 3, the encryption system includes: a terminal 31 and a DM server 32, wherein the terminal 31 is configured to perform an encryption operation according to information of an encryption sub-node of an EADMO node of a local DM tree when receiving an encryption instruction sent from the DM server 32, to report encrypted data state information generated after the encryption succeeds to the DM server 32, and when receiving an updating instruction from the DM server 32, to update, according to the updating instruction, information of a Store URL sub-node of the EADMO node of the DM tree into a URL for the DM server 32 to locally store the encrypted data state information;

the DM server 32 is configured to send the encryption instruction to the terminal 31, and when receiving the encrypted data state information sent from the terminal 31, to update the information of the Store URL sub-node of the EADMO node of the DM tree of the terminal 31 into the URL for the DM server 32 to locally store the encrypted data state information.

Preferably, the terminal 31 includes: a first receiving unit 311, a first encrypting unit 312, a first sending unit 313, and a first storing unit 314, wherein the first receiving unit 311 is configured to receive the encryption instruction sent from the DM server 32; to receive the updating instruction sent from the DM server 32, wherein the instruction updates the information of the Store URL sub-node of the EADMO node of the DM tree in the first storing unit 314 into the URL, wherein the URL is a URL for the DM server 32 to locally store the encrypted data state information sent from the first sending unit 313;

the first encrypting unit 312 is configured, when the first receiving unit 311 receives the encryption instruction, to perform the encryption operation according to the information of the encryption sub-node of the EADMO node in the DM tree, wherein the information of the encryption sub-node of the EADMO node in the DM tree is stored by the first storing unit 314, and to generate the encrypted data state information after the encryption succeeds;

the first sending unit 313 is configured to send the DM server 32 the encrypted data state information generated after the first encrypting unit 312 performs the encryption successfully;

the first storing unit 314 is configured to store information of the EADMO node of the DM tree, to update, according to the updating instruction when the first receiving unit 311 receives the updating instruction, the information of the Store URL sub-node of the EADMO node of the DM tree into the URL for the DM server 32 to locally store the encrypted data state information.

Preferably, the first receiving unit 311 is further configured to receive from the DM server 32 an instruction for obtaining information of a State sub-node of the EADMO sub-node of the DM tree of the first storing unit 314, and to receive the encryption instruction or a message indicating that encryption has been performed, wherein the encryption instruction or the message indicating that encryption has been performed is sent from the DM server 32;

the first sending unit 313 is further configured to send the information of the State sub-node to the DM server 32 when the first receiving unit 311 receives from the DM server 32 the instruction for obtaining the information of the State sub-node of the EADMO node of the DM tree of the first storing unit 314.

Preferably, the first sending unit 313 is further configured to send the DM server 32 a decryption key generated when the first encrypting unit 312 performs the encryption successfully.

Preferably, the first sending unit 313 is further configured to send an encryption success message to the DM server 32 when the first encrypting unit 312 performs the encryption successfully.

The first receiving unit 311 is further configured to receive the updating instruction from the DM server 32.

The first storing unit 314 is further configured, when the first receiving unit 311 receives the updating instruction sent from the DM server 32, to update, according to the updating instruction, the stored information of the State sub-node of the EADMO node of the DM tree to be encrypted, wherein the first receiving unit 311 may be implemented by a receiver in the terminal during practical application; the first encrypting unit 312 may be implemented by a Central Processing Unit (CPU), a Digital Signal Processor (DSP) or a Field-Programmable Gate Array (FPGA) in the terminal during practical application; the first sending unit 313 may be implemented by a transmitter in the terminal during practical application, and the first storing unit 314 may be implemented by a storage device in the terminal during practical application.

Preferably, the DM server 32 further includes: a second sending unit 321, a second receiving unit 322 and a second storing unit 323, wherein the second sending unit 321 is configured to send the encryption instruction to the terminal 31; and when the second receiving unit 322 receives the encrypted data state information generated and sent after the terminal 31 performs the encryption successfully, to send the updating instruction to the terminal 31 to update the information of the Store URL sub-node of the EADMO node of the DM tree of the terminal 31 into an URL for the second storing unit 323 to store the encrypted data state information;

the second receiving unit 322 is configured to receive the encrypted data state information generated and sent after the terminal 31 performs the encryption successfully;

the second storing unit 323 is configured to store the encrypted data state information received by the second receiving unit 322.

Preferably, the DM server 332 further includes:

a first determining unit 324 configured, when the second receiving unit 322 receives the information of the State sub-node of the EADMO node of the DM tree of the terminal 31, to determine whether the information of the State sub-node is unencrypted;

the second sending unit 321 is further configured to send the terminal 31 the instruction for obtaining the information of the State sub-node of the EADMO node of the DM tree; when a determination result of the first determining unit 324 is yes, to send the encryption instruction to the terminal 31; and when a determination result of the first determining unit 324 is no, to send the terminal 31 or a terminal used by a user a message indicating that encryption has been performed;

the second receiving unit 322 is further configured to receive the information of the State sub-node of the EADMO node of the DM tree from the terminal 31.

Preferably, the second receiving unit 322 is further configured to receive the decryption key generated and sent after the terminal 31 performs the encryption successfully.

the second storing unit 323 is further configured to store the decryption key, received by the second receiving unit 322, and generated and sent after the terminal 31 performs the encryption successfully.

Preferably, the second receiving unit 322 is further configured to receive an encryption success message sent after the terminal 31 performs the encryption successfully;

the second sending unit 321 is further configured, when the second receiving unit 322 receives the encryption success message sent after the terminal 31 performs the encryption successfully, to send the updating instruction to the terminal 31 to update the information of the State sub-node of the EADMO node of the DM tree be encrypted, wherein the second receiving unit 322 may be implemented by a receiver in the DM server during practical application; the second sending unit 321 may be implemented by a transmitter in the DM server during practical application; the first determining unit 324 may be implemented by a CPU, a DSP or an FPGA in the DM server during practical application, and the second storing unit 323 may be implemented by a storage device in the DM server during practical application.

Figure 4:
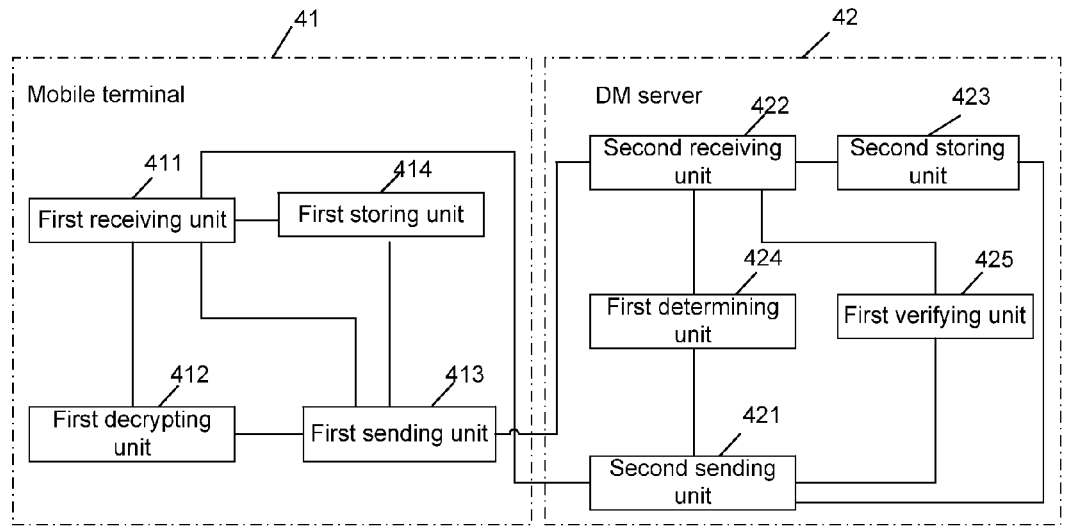
FIG. 4 is a schematic diagram of a composition structure of a decryption system according to an embodiment of the disclosure.

FIG. 4 is a schematic diagram of a composition structure of a decryption system according to an embodiment of the disclosure. As shown in FIG. 4, the decryption system includes a terminal 41 and a DM server 42, wherein the terminal 41 is configured, when receiving a decryption requested sent from the DM server 42, to request the DM server 42 for encrypted data state information to which a URL stored by a Store URL sub-node of an EADMO node of a DM tree of the terminal 41 is directed, and when receiving the encrypted data state information sent from the DM server 42, to perform a decryption operation according to the encrypted data state information;

the DM server 42 is configured to send the decryption instruction to the terminal 41, to respond to the request of the terminal 41, and to send the terminal 41, the encrypted data state information to which the URL stored by the Store URL sub-node of the EADMO node of the DM tree is directed.

Preferably, the terminal 41 includes a first receiving unit 411, a first decrypting unit 412, a second sending unit 413 and a first storing unit 414, wherein the first receiving unit 411 is configured to receive the decryption instruction sent from the DM server 42, and to receive the encrypted data state information sent from the DM server 42;

the first decrypting unit 412 is configured, when the first receiving unit 411 receives the encrypted data state information sent from the DM server 42, to perform the decryption operation according to the encrypted data state information;

the second sending unit 413 is configured, when the first receiving unit 411 receives the decryption instruction, to send the DM server 42 an instruction for obtaining the encrypted data state information, wherein the encrypted data state information is the encrypted data state information to which the URL stored by the Store URL sub-node of the EADMO node of the DM tree of the first storing unit 414 is directed;

the first storing unit 414 is further configured to store information of the EADMO node of the DM tree.

Preferably, the first receiving unit 411 is further configured to receive from the DM server 42 an instruction for obtaining information of a State sub-node of the EADMO node of the DM tree of the first storing unit 414;

the second sending unit 413 is further configured, when the first receiving unit 411 receives from the DM server 42 the instruction for obtaining the information of the State sub-node of the EADMO node of the DM tree of the first storing unit 414, to send the DM server 42 the information of the State sub-node.

Preferably, the first receiving unit 411 is further configured to receive from the DM server 42 an instruction for obtaining a decrypting key held by a user;

the second sending unit 413 is further configured, when the first receiving unit 411 receives the instruction for obtaining the decrypting key held by the user, to send the decrypting key held by the user to the DM server 42.

Preferably, the second sending unit 413 is further configured to send the DM server 42 a decryption success message when the first decryption unit 412 performs the decryption successfully;

the first receiving unit 411 is further configured to receive the updating instruction from the DM server 42;

the first storing unit 414 is further configured, when the first receiving unit 411 receives the updating instruction sent from the DM server 42, to update, according to the updating instruction, the stored information of the State sub-node of the EADMO node of the DM tree to be unencrypted;

wherein the first receiving unit 411 may be implemented by a receiver in the terminal during practical application; the first decrypting unit 412 may be implemented by a CPU, a DSP or an FPGA in the terminal during practical application; the second sending unit 413 may be implemented by a transmitter in the terminal during practical application, and the first storing unit 414 may be implemented by a storage device in the terminal during practical application.

Preferably, the DM server 42 includes a second sending unit 421, a second receiving unit 422 and a second storing unit 423, wherein the second sending unit 421 is configured to send the decryption instruction to the terminal 41; when the second receiving unit 422 receives from the terminal 41 the instruction for requesting for the encrypted data state information, to which the URL requested by the terminal 41 is directed and which is stored by the second storing unit 423, to send the terminal 41 the encrypted data state information to which the URL is directed;

the second receiving unit 422 is configured to receive from the terminal 41 the instruction for obtaining the encrypted data state information to which the URL stored by the Store URL sub-node of the EADMO node of the DM tree is directed;

the second storing unit 423 is configured to store the encrypted data state information.

Preferably, the DM server 42 further includes:

a first determining unit 424 configured, when the second receiving unit 422 receives the information of the State sub-node of the EADMO node of the DM tree of the terminal 41, to determine whether the information of the State sub-node is encrypted;

the second sending unit 421 is further configured to send the terminal 41 the instruction for obtaining the information of the State sub-node of the EADMO node of the DM tree; when a determining result of the first determining unit 424 is yes, to send the decryption instruction to the terminal 41, and when a determining result of the first determining unit 424 is no, to send the terminal 41 or a terminal currently used by a user a message indicating that decryption has been performed;

the second receiving unit 422 is configured to receive from the terminal 41 the information of the State sub-node of the EADMO node of the DM tree.

Preferably, the DM server 42 further includes:

a first verifying unit 425, configured to verify whether a decryption key held by a user and received by the second receiving unit 422 can be matched with a decryption key stored by the second storing unit 423;

the second sending unit 421 is further configured to send the terminal 41 or the terminal currently used by the user, an instruction for obtaining the decryption key held by the user; when a verifying result of the first verifying unit 425 is yes, to send the decryption instruction to the terminal 41, and when a verifying result of the first verifying unit 425 is no, to send the corresponding terminal 41 or the terminal currently used by the user a key verification failure message;

the second receiving unit 422 is further configured to receive the decryption key sent from the terminal 41 or the terminal currently used by the user;

the second storing unit 423 is configured to store the decryption key.

Preferably, the second receiving unit 422 is further configured to send a decryption success message after the terminal 41 performs the decryption successfully;

the second sending unit 421 is further configured, when the second receiving unit 422 receives the decryption success message sent after the terminal 41 performs the decryption successfully, to send the updating instruction to the terminal 41 to update the information of the State sub-node of the EADMO node of the DM tree to be unencrypted, wherein the second sending unit 421 may be implemented by a transmitter in the DM server during practical application; the second receiving unit 422 may be implemented by a receiver in the DM server during practical application; the second storing unit 423 may be implemented by a storage device in the DM server during practical application; the first determining unit 424 and the first verifying unit 425 may be implemented by a CPU, a DSP or an FPGA in the DM server during practical application.

Figure 5:
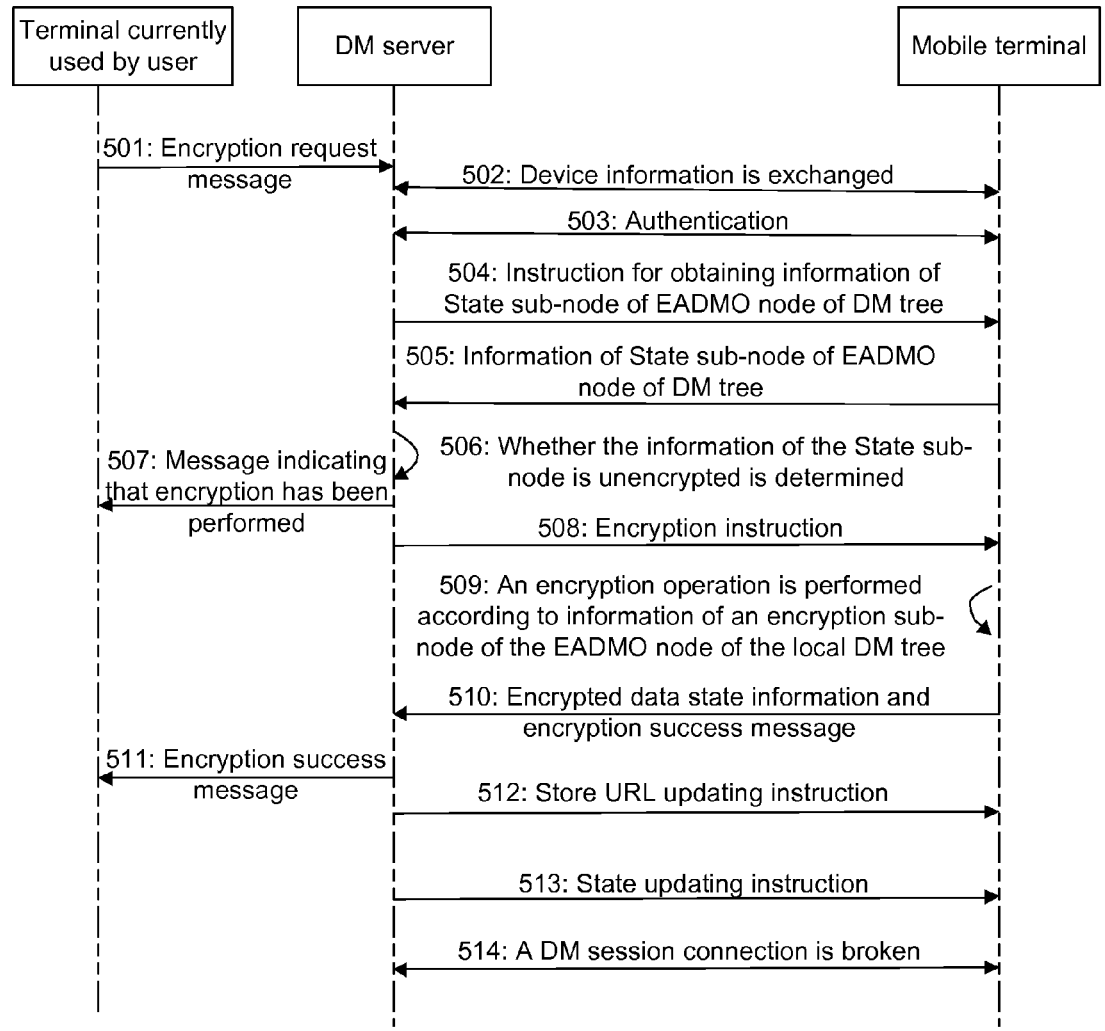
FIG. 5 is a schematic diagram of an implementation process of an encryption operation according to an embodiment of the disclosure.

FIG. 5 is a schematic diagram of an implementation process of an encryption operation according to an embodiment of the disclosure. As shown in FIG. 5, the implementation process includes the following steps.

Step 501: A user sends a DM server an encryption request message through a terminal used currently.

Step 502: The DM server receives the encryption request message and exchanges device information with the terminal.

Step 503: The DM server and the terminal complete authentication for each other.

Step 504: The DM server sends the terminal an instruction for obtaining information of a State sub-node of an EADMO node of a DM tree, wherein the EADMO node of the DM tree of the terminal includes:

a State sub-node: the node stores a data state of the current terminal, including an encrypted state or a decrypted state;

a Whether Notify User sub-node: whether to notify an encryption or decryption operation result to the user is set through the node, a set value 1 of the node indicates that the user will be notified, and a value 0 indicates that the user will not be notified;

an Encryption Mode sub-node: the node may set the terminal to perform encryption according to one of the following methods:

Encryption By File Name: the file name is a file name without a suffix name; if encryption is set to be performed by file names, all files having file names containing a keyword stored in a File Name secondary Sub-node in an Encryption Key Words sub-node are encrypted, and a value 3 of the Encryption Mode sub-node indicates that this encryption method is used;

Encryption By File Suffix Name: if encryption is set to be performed by such an encryption method, all files having suffix names containing a keyword stored in a File suffix Name secondary Sub-node in an Encryption Key Words sub-node are encrypted, and a value 2 of the Encryption Mode sub-node indicates that this encryption method is used;

Encryption By Both: if encryption is performed by such an encryption method, all files having file names containing a keyword stored in a File Name secondary Sub-node in an Encryption Key Words sub-node are encrypted and all files having suffix names containing a keyword stored in a File suffix Name secondary Sub-node in an Encryption Key Words sub-node are encrypted; and a value 1 of the Encryption Mode sub-node indicates that this encryption method is used.

an Encryption Level sub-node: values 1, 2 and 3 of the node correspond to encryption levels using encryption algorithms of different complexities respectively;

an Encryption Key Words sub-node, including:

a File Name secondary sub-node: a keyword of a to-be-encrypted file name;

a File Suffix Name secondary sub-node: a keyword of a suffix name of a to-be-encrypted file;

an Encryption sub-node: the node stores an encryption operation instruction string which is executed by the terminal when receiving an encryption instruction sent from the DM server;

a Store URL sub-node: a URL for the DM server to store an encrypted data state;

a Decryption sub-node: the node stores a decryption operation instruction string which is executed by the terminal when receiving a decryption instruction sent from the DM server;

Step 505: The terminal sends the DM server the information of the State sub-node of the EADMO node of the DM tree.

Step 506: The DM server determines whether the information of the State sub-node of the EADMO node of the DM tree is unencrypted. If yes, step 508 is performed. Otherwise, step 507 and step 514 are performed in turn.

Step 507: The DM server sends the terminal currently used by the user a message indicated that encryption has been performed.

Step 508: The DM server sends an encryption instruction to the terminal.

Step 509: The terminal performs an encryption operation according to information of the encryption sub-node of the EADMO node of the DM tree.

The terminal reads a value of the Encryption Mode sub-node to determine an encryption mode, and if the value of the Encryption Mode sub-node is 1, encrypts, according to an encryption level corresponding to a value stored by the Encryption level sub-node, files having file names containing a keyword stored by the File Name secondary Sub-node and files having file suffix names containing a keyword stored in a File Suffix Name secondary Sub-node, sends the DM server a decryption key and encrypted data state information, reads a value of the Whether Notify User sub-node, determines whether to notify an encryption result to a user, and sends the DM server an encryption success message when the value of the Whether Notify User sub-node is 1.

Step 510: The DM server receives the encrypted data state information and the encryption success message.

Step 511: The DM server sends the terminal currently used by the user the encryption success message and the decryption key.

Step 512: The DM server sends a Store URL updating instruction to the terminal.

The instruction updates information of the Store URL sub-node of the EADMO node of the DM tree of the terminal into a URL for the DM server to locally store the encrypted data state information.

Step 513: The DM server sends a State updating instruction to the terminal.

The instruction updates the information of the State sub-node of the EADMO node of the DM tree of the terminal to be encrypted.

Step 514: The DM server breaks a DM session connection with the terminal.

Figure 6:
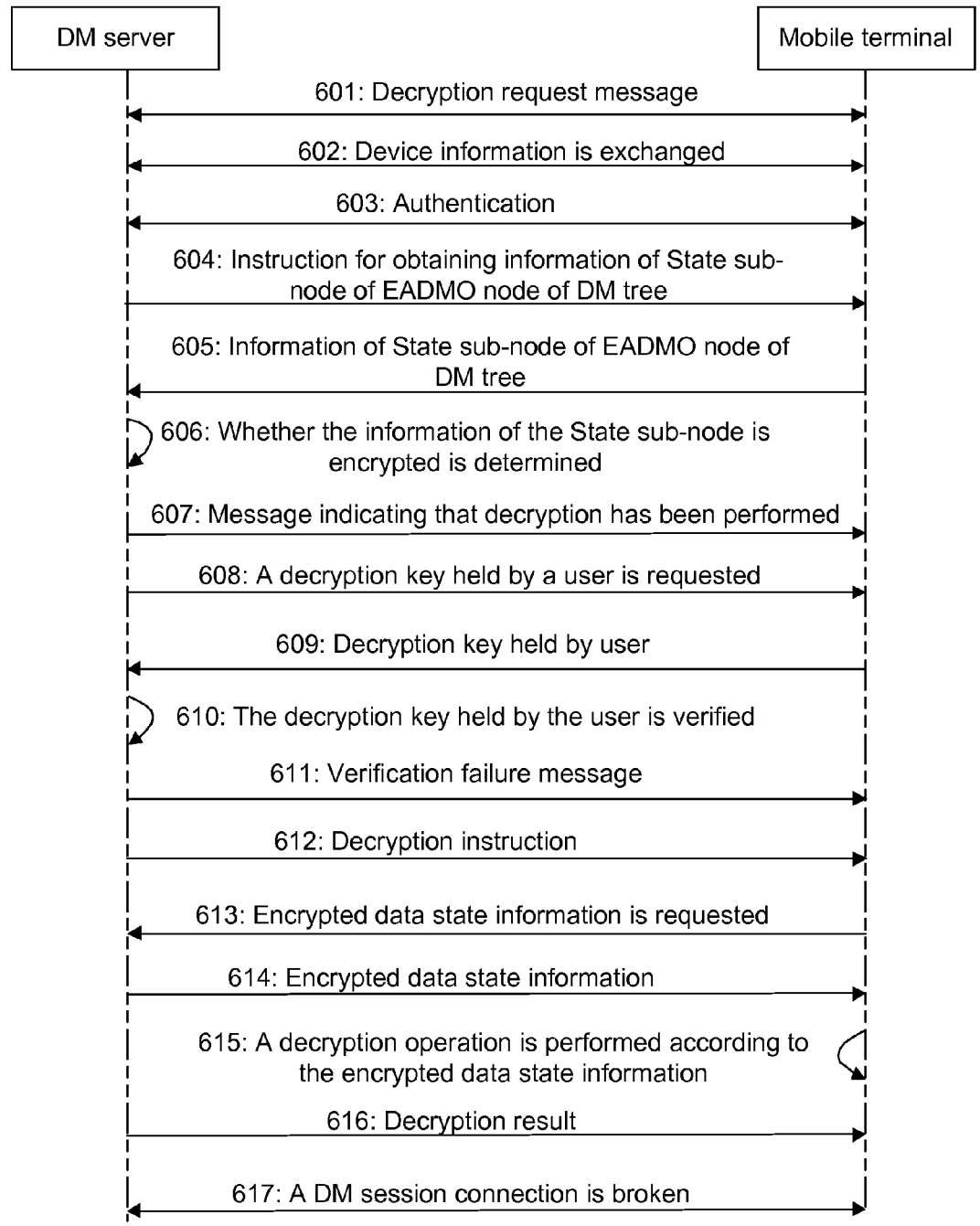
FIG. 6 is a schematic diagram of an implementation process of a decryption operation according to an embodiment of the disclosure.

FIG. 6 is a schematic diagram of an implementation process of a decryption operation according to an embodiment of the disclosure. As shown in FIG. 6, the implementation process includes the following steps.

Step 601: A user sends a decryption request message to a DM server directly through a terminal.

Step 602: The DM server receives the decryption request message and exchanges device information with the terminal.

Step 603: The DM server and the terminal complete authentication for each other.

Step 604: The DM server sends the terminal an instruction for obtaining information of a State sub-node of an EADMO node of a DM tree, wherein a structure of the EADMO node of the DM tree of the terminal is the same as that described in the first embodiment.

Step 605: The terminal sends the DM server the information of the State sub-node of the EADMO node of the DM tree.

Step 606: The DM server determines whether the information of the State sub-node of the EADMO node of the DM tree is encrypted. If yes, step 608 is performed. Otherwise, step 607 and step 618 are performed in turn.

Step 607: The DM server sends the terminal a message indicated that encryption has been performed.

Step 608: The DM server sends the terminal an instruction for obtaining a decryption key held by the user.

Step 609: The terminal sends the DM server the decryption key held by the user.

Step 610: The DM server verifies the decryption key held by the user.

The DM server verifies whether the decryption key held by the user can be matched with a locally stored decryption key. If yes, step 612 is performed. Otherwise, step 611 and step 618 are performed in turn.

Step 611: The DM server sends the terminal a key verification failure message.

Step 612: The DM server sends the terminal a decryption instruction.

Step 613: The terminal sends the DM server a request message of encrypted data state information.

The terminal executes an instruction string stored in a Decryption sub-node of the EADMO node of the local DM tree when receiving an encryption instruction sent from the DM server, executes, according to an instruction of the instruction string, an operation of sending the DM server the request message of the encrypted data state information. The encrypted data state information is encrypted data state information to which a URL stored in a Store sub-node of the EADMO node of the DM tree is directed.

Step 614: The DM server sends the terminal the encrypted data state information.

The DM server sends the terminal, according to a URL included in the received request message, the encrypted data state information to which the URL is directed.

Step 615: The terminal performs a decryption operation according to the encrypted data state information.

The encrypted data state information includes the following information of encrypted data:

an encryption mode, an encryption keyword and an encryption level.

Step 616: The terminal sends the DM server a decryption success message.

Step 617: The DM server sends the terminal a State updating instruction.

The instruction updates the information of the State sub-node of the EADMO node of the DM tree of the terminal to be unencrypted.

Step 618: The DM server breaks a DM session connection with the terminal.

The foregoing descriptions are only preferred embodiments of the disclosure and are not used for limiting the protection scope of the disclosure.

INDUSTRIAL APPLICABILITY

In the technical solutions provided by the embodiments of the disclosure, after stored data is encrypted, encrypted data state information is reported to a DM server; during a decryption operation performed subsequently, the decryption operation is performed according to the corresponding encrypted data state information sent from the DM server, and a user does not need to record files that have been decrypted and details including hiding and renaming and so on of the decryption operation, thus operation is simple without causing data loss. In the meanwhile, the user may request the DM server to encrypt a non-local terminal through a terminal currently used by the user, and the DM server sends a decryption instruction to the non-local terminal, thus solving a problem that a user cannot encrypt a terminal device that is not carried along.

What is claimed is:

1. An encryption method, comprising:
    performing, by a terminal, an encryption operation for data of the terminal according to information of an encryption sub-node of an Encrypt And Decrypt Management Object (EADMO) node of a local Device Management (DM) tree when receiving an encryption instruction sent from a DM server; wherein the EADMO node is a node added to the DM tree of the terminal;
    reporting to the DM server, by the terminal, encrypted data state information generated after the encryption succeeds; updating, by the terminal according to an updating instruction sent from the DM server, information of a Store Uniform Resource Locator (URL) sub-node of the EADMO node of the DM tree into a URL for the DM server to locally store the encrypted data state information.

2. The method according to claim 1, further comprising: before the DM server sends the encryption instruction to the terminal,
    obtaining, by the DM server, information of a State sub-node of the EADMO node of the DM tree of the terminal, determining whether the information of the State sub-node is unencrypted; if yes, then sending the encryption instruction to the terminal; otherwise, sending the terminal or a terminal currently used by a user a message indicating that encryption has been performed.

3. A decryption method, comprising:
    requesting a Device Management (DM) server, by a terminal, for encrypted data state information to which a Uniform Resource Locator (URL) stored by a Store URL sub-node of an Encrypt And Decrypt Management Object (EADMO) node of a DM tree of the terminal is directed, when receiving a decryption instruction sent from the DM server; wherein the EADMO node is a node added to the DM tree of the terminal;
    performing, by the terminal, a decryption operation for data of the terminal according to the encrypted data state information sent from the DM server
    further comprising: before the DM server sends the decryption instruction to the terminal,
    obtaining, by the DM server, a decryption key held by a user from the terminal or a terminal currently used by a user; verifying whether the decryption key can be matched with a locally stored decryption key; if yes, sending the decryption instruction to the terminal: otherwise, sending a key verification failure message to the corresponding terminal or the terminal currently used by the user.

4. The method according to claim 3, further comprising: after the terminal performs the decryption successfully,
    sending, by the terminal, a decryption success message to the DM server; and updating, by the terminal according to an updating instruction sent from the DM server, the information of the State sub-node of the EADMO node of the local DM tree to be unencrypted.

5. A terminal, comprising: a first receiving unit, a first encrypting unit, a first sending unit, and a first storing unit, wherein
    the first receiving unit is configured to receive an encryption instruction sent from a Device Management (DM) server; to receive an updating instruction sent from the DM server, wherein the instruction updates information of a Store Uniform Resource Locator (URL) sub-node of an Encrypt And Decrypt Management Object (EADMO) node of a Device Management (DM) tree of the first storing unit into a URL, wherein the URL is a URL for the DM server to locally store encrypted data state information sent from the first sending unit; wherein the EADMO node is a node added to the DM tree of the terminal;
    the first encrypting unit is configured, when the first receiving unit receives the encryption instruction, to perform an encryption operation for data of the terminal according to information of an encryption sub-node of the EADMO node of the DM tree, wherein the information of the encryption sub-node of the EADMO node of the DM tree is stored by the first storing unit; and to generate the encrypted data state information after the encryption succeeds;
    the first sending unit is configured to send the DM server the encrypted data state information generated after the first encrypting unit performs the encryption successfully;
    the first storing unit is configured to store information of the EADMO node of the DM tree, to update, according to the updating instruction received by the first receiving unit, the information of the Store URL sub-node of the EADMO node of the DM tree into the URL for the DM server to locally store the encrypted data state information.

6. The terminal according to claim 5, further comprising: a second receiving unit, a first decrypting unit, a second sending unit and a second storing unit, wherein
    the second receiving unit is configured to receive a decryption instruction sent from the DM server and to receive the encrypted data state information sent from the DM server;
    the first decrypting unit is configured to perform a decryption operation according to the encrypted data state information received by the second receiving unit;
    the second sending unit is configured, when the second receiving unit receives the decryption instruction, to send the DM server an instruction for obtaining the encrypted data state information, wherein the encrypted data state information is encrypted data state information to which a URL in information of a Store URL sub-node is directed and the Store URL sub-node is located in an EADMO node of a DM tree of the second storing unit;
    the second storing unit is configured to store information of the EADMO node of the DM tree.

7. A terminal, wherein the terminal includes: a second receiving unit, a first decrypting unit, a second sending unit and a second storing unit, wherein
    the second receiving unit is configured to receive a decryption instruction sent from a Device Management (DM) server, and to receive encrypted data state information sent from the DM server;
    the first decrypting unit is configured, when the second receiving unit receives the encrypted data state information sent from the DM server, to perform a decryption operation for data of the terminal according to the encrypted data state information;
    the second sending unit is configured, when the second receiving unit receives the decryption instruction, to send the DM server an instruction for obtaining the encrypted data state information, wherein the encrypted data state information is encrypted data state information to which a Uniform Resource Locator (URL) in information of a Store URL sub-node is directed, and the Store URL sub-node is located in an Encrypt And Decrypt Management Object (EADMO) node of a DM tree of the second storing unit; wherein the EADMO node is a node added to the DM tree of the terminal;

the second storing unit is configured to store information of the EADMO node of the DM tree;

the second receiving unit is further configured to receive an instruction for obtaining a decryption key held by a user, wherein the instruction is sent from the DM server;

the second sending unit is further configured, when the second receiving unit receives the instruction for obtaining the decryption key held by the user, to send the decryption key held by the user to the DM server.

8. The terminal according to claim 7, wherein
the second sending unit is further configured, when the first decryption unit performs the decryption successfully, to send a decryption success message to the DM server;

the second receiving unit is further configured to receive an updating instruction from the DM server;

the second storing unit is further configured to update, according to the updating instruction received by the first receiving unit, the stored information of the State sub-node of the EADMO node of the DM tree to be unencrypted.

9. A Device Management (DM) server, comprising: a third sending unit, a third receiving unit and a third storing unit, wherein
the third sending unit is configured to send an encryption instruction to a terminal; when the third receiving unit receives encrypted data state information generated and sent after the terminal performs encryption successfully, to indicate the terminal to update information of a Store Uniform Resource Locator (URL) sub-node of an Encrypt And Decrypt Management Object (EADMO) node of a local DM tree of the terminal, wherein the updated information of the Store URL sub-node is a URL for the third storing unit to store the encrypted data state information; wherein the EADMO node is a node added to the DM tree of the terminal;

the third receiving unit is configured to generate and send the encrypted data state information after the terminal performs the encryption successfully;

the third storing unit is configured to store the encrypted data state information received by the third receiving unit.

10. The DM server according to claim 9, further comprising:
a first determining unit configured, when the third receiving unit receives information of a State sub-node of the EADMO node of the DM tree of the terminal, to determine whether the information of the State sub-node is unencrypted;

the third sending unit is further configured to send the terminal an instruction for obtaining the information of the State sub-node; when a determination result of the first determining unit is yes, to send an encryption instruction to the terminal; and when a determination result of the first determining unit is no, to send the terminal or a terminal used by a user a message indicating that encryption has been performed;

the third receiving unit is further configured to receive the information of the State sub-node from the terminal.

11. The DM server according to claim 9, further comprising: a fourth sending unit, a fourth receiving unit and a fourth storing unit, wherein the fourth sending unit is configured to send a decryption instruction to the terminal; when the fourth receiving unit receives from the terminal an instruction for requesting for the encrypted data state information, to send the encrypted data state information to the terminal;

the fourth receiving unit is configured to receive from the terminal an instruction for requesting for the encrypted data state information to which the URL stored by the Store URL sub-node is directed;

the fourth storing unit is configured to store the encrypted data state information.

12. A Device Management (DM) server, comprising: a fourth sending unit, a fourth receiving unit, and a fourth storing unit, wherein
the fourth sending unit is configured to send a decryption instruction to a terminal; and when the fourth receiving unit receives from the terminal an instruction for requesting for encrypted data state information to which a Uniform Resource Locator (URL) is directed and which is stored by the fourth storing unit, to send the terminal the encrypted data state information to which the URL is directed;

the fourth receiving unit is configured to receive from the terminal the instruction for requesting for the encrypted data state information to which the URL is directed, wherein the URL is located in a Store URL of an Encrypt And Decrypt Management Object (EADMO) node of a DM tree of the terminal; wherein the EADMO node is a node added to the DM tree of the terminal;

the fourth storing unit is configured store the encrypted data state information;

further comprising:
a first verifying unit, configured to verify whether a decryption key held by a user and received by the fourth receiving unit can be matched with a decryption key stored by the fourth storing unit;

the fourth sending unit is further configured to send the terminal or a terminal currently used by a user an instruction for obtaining the decryption key held by the user; when a verifying result of the first verifying unit is yes, to send a decryption instruction to the terminal; and when a verifying result of the first verifying unit is no, to send the corresponding terminal or the terminal currently used by the user a key verification failure message;

the fourth receiving unit is further configured to receive the decryption key sent from the terminal or the terminal currently used by the user;

the fourth storing unit is further configured to store the decryption key.

13. The DM server according to claim 12, further comprising:
a second determining unit configured, when the fourth receiving unit receives information of a State sub-node, to determine whether the information of the State sub-node is encrypted;

the fourth sending unit is further configured to send the terminal an instruction for obtaining the information of the State sub-node; when a determining result of the second determining unit is yes, to send a decryption instruction to the terminal, and when a determining result of the second determining unit is no, to send the terminal or a terminal currently used by a user a message indicating that decryption has been performed;

the fourth receiving unit is configured to receive from the terminal the information of the State sub-node of the EADMO of the DM tree.

14. The DM server according to claim 12, wherein
the fourth receiving unit is further configured to receive a decryption success message sent after the terminal performs the decryption successfully;
the fourth sending unit is further configured, when the fourth receiving unit receives the decryption success message sent after the terminal performs the decryption successfully, to indicate the terminal to update the information of the State sub-node of the EADMO of the DM tree to be unencrypted.

15. The method according to claim 1, further comprising:
after the terminal performs the encryption successfully,
requesting the DM server, by the terminal, for encrypted data state information to which a URL stored by the Store URL sub-node of the EADMO node of the DM tree of the terminal is directed, when receiving a decryption instruction sent from the DM server;
performing, by the terminal, a decryption operation according to the encrypted data state information when receiving the encrypted data state information sent from the DM server;
after the terminal performs the encryption successfully, sending, by the terminal, an encryption success message to the DM server, and updating the information of the State sub-node of the EADMO node of the local DM tree to be encrypted according to an updating instruction sent from the DM server.

16. The method according to claim 3, further comprising:
before the DM server sends the decryption instruction to the terminal,
obtaining, by the DM server, information of a State sub-node of the EADMO node of the DM tree of the terminal; determining whether the information of the State sub-node has been encrypted; if yes, sending the decryption instruction to the terminal; otherwise, sending the terminal or a terminal currently used by a user a message indicating that decryption has been performed.

17. The terminal according to claim 5, wherein
the first receiving unit is further configured to receive from the DM server an instruction for obtaining information of a State sub-node, wherein the information of the state sub-node is stored by the first storing unit, to receive the encryption instruction or a message indicating that encryption has been performed, wherein the encryption instruction or the message indicating that encryption has been performed is sent from the DM server;
the first sending unit is further configured to send the information of the State sub-node to the DM server when the first receiving unit receives from the DM server the instruction for obtaining the information of the State sub-node;
the first sending unit is further configured to send an encryption success message to the DM server after the first encrypting unit performs the encryption successfully;
the first receiving unit is further configured to receive the updating instruction from the DM server;
the first storing unit is further configured to update, according to the updating instruction received by the first receiving unit, the information of the State sub-node of the EADMO node of the DM tree to be encrypted.

18. The terminal according to claim 7, wherein
the second receiving unit is further configured to receive from the DM server an instruction for obtaining information of a State sub-node of the EADMO node of the DM tree of the second storing unit;
the second sending unit is further configured, when the second receiving unit receives from the DM server the instruction for obtaining the information of the State sub-node, to send the information of the State sub-node to the DM server.

19. The DM server according to claim 9, wherein
the third receiving unit is further configured to receive a decryption key generated and sent after the terminal performs the encryption successfully;
the third storing unit is further configured to store the decryption key generated and sent after the terminal performs the encryption successfully;
the third receiving unit is further configured to receive an encryption success message sent after the terminal performs the encryption successfully;
the third sending unit is further configured, when the third receiving unit receives the encryption success message sent after the terminal performs the encryption successfully, to send an updating instruction to the terminal to indicate the terminal to update the information of the State sub-node of the EADMO node of the local DM tree to be encrypted.

20. The method according to claim 1, the encryption sub-node of the EADMO node of the local DM tree comprises:
an encryption mode sub-node, an encryption key words sub-node and an encryption level sub-node, wherein
information stored by the encryption mode sub-node is a set encryption mode, including encryption by a file name and/or encryption by a file suffix name;
information stored by the encryption key words sub-node is a set encrypted keyword, including a file name keyword and a keyword of a file suffix name, and the file name is a file name without a file suffix name;
information stored by the encryption level sub-node is a set encryption level; different encryption levels may be set according to different complexities of encryption algorithms, and an encryption level is positively correlated to the complexity of an encryption algorithm;
the step of performing, by a terminal, an encryption operation for data of the terminal according to information of an encryption sub-node of an Encrypt And Decrypt Management Object (EADMO) node of a local Device Management (DM) tree when receiving an encryption instruction sent from a DM server comprises:
when the terminal receives the encryption instruction, which is an instruction for executing a preset instruction string in the encryption sub-node of the EADMO node of the DM tree, sent from the DM server, performing, the encryption operation for data of the terminal according to information stored in the encryption mode, the encryption key words and the encryption level sub-nodes in the encryption sub-node of the EADMO node of the DM tree.

21. The method according to claim 1, the terminal is any terminal used currently by a user or a terminal in which data is to be encrypted or decrypted.

* * * * *